(12) United States Patent
Periaswamy

(10) Patent No.: US 8,805,122 B1
(45) Date of Patent: Aug. 12, 2014

(54) SYSTEM, METHOD, AND COMPUTER-READABLE MEDIUM FOR INTERPOLATING SPATIALLY TRANSFORMED VOLUMETRIC MEDICAL IMAGE DATA

(75) Inventor: Senthil Periaswamy, Hollis, NH (US)

(73) Assignee: iCad, Inc., Nashua, NH (US)

( * ) Notice: Subject to any disclaimer, the term of this patent is extended or adjusted under 35 U.S.C. 154(b) by 634 days.

(21) Appl. No.: 13/020,138

(22) Filed: Feb. 3, 2011

(51) Int. Cl.
*G06K 9/00* (2006.01)

(52) U.S. Cl.
USPC ............................ 382/300; 382/128; 382/154

(58) Field of Classification Search
USPC .................. 382/128, 131, 132, 154, 298–300
See application file for complete search history.

(56) References Cited

U.S. PATENT DOCUMENTS

| 7,620,227 B2 | 11/2009 | Gering et al. | |
|---|---|---|---|
| 2008/0175456 A1* | 7/2008 | Ioannou | 382/131 |
| 2010/0092053 A1* | 4/2010 | Manabe et al. | 382/128 |

OTHER PUBLICATIONS

Keys, "Cubic Convolution Interpolation for Digital Image Processing", "Transactions on Acoustics, Speech, and Signal Processing", Dec. 1981, pp. 1153-1160, vol. ASSP-29, No. 6, Publisher: IEEE, Published in: US.

* cited by examiner

*Primary Examiner* — Wesley Tucker
(74) *Attorney, Agent, or Firm* — Loginov & Associates, PLLC; William A. Loginov

(57) ABSTRACT

Disclosed herein are a computer system, an image processing method, and a computer-readable medium for interpolating volumetric medical image data. There is disclosed a hybrid interpolation procedure performed on the volumetric medical image data in accordance with spatial transforms. In the hybrid interpolation procedure, a different order of interpolation, respectively, is performed for at least two different dimensions of the volumetric medical image data. The different orders of interpolation can include bicubic interpolation and linear interpolation. Applications include registration of source volumetric medical images to target volumetric medical images and operations (e.g., rotation, re-scaling) invoking a transformation for medical image data visualization/display purposes.

26 Claims, 4 Drawing Sheets

SYSTEM, METHOD, AND COMPUTER-READABLE MEDIUM FOR INTERPOLATING SPATIALLY TRANSFORMED VOLUMETRIC MEDICAL IMAGE DATA

BACKGROUND

1. Field of the Invention

This application relates generally to processing three-dimensional or volumetric medical images to improve the detection and diagnosis of disease. More particularly, this application relates to interpolating spatially transformed volumetric medical image data.

2. Description of the Related Art

Medical imaging examinations provide detailed information useful for differentiating, diagnosing, or monitoring the condition, structure, and/or extent of various types of tissue within a patient's body. In general, medical imaging examinations detect and record manners in which tissues respond in the presence of applied signals and/or injected or ingested substances, and generate visual representations indicative of such responses. For example, a contrast agent administered to the patient can selectively enhance or affect the imaging properties of particular tissue types to facilitate improved tissue differentiation. Magnetic resonance imaging (MRI) can excel at distinguishing between malignant and/or benign tumors or lesions that are contrast enhanced relative to healthy tissue in the presence of contrast agent.

Many medical imaging examinations now generate three-dimensional (i.e., volumetric) or four-dimensional (e.g., volumes across time) medical image data. In a clinical setting, the clinician requires computer systems with image analysis solutions that aid in the interpretation of the data. While such systems must be computationally efficient, processing efficiency should not come at the expense of quality, considering that successful disease detection or diagnosis often requires examination of tissue properties (e.g., shape, texture, signal intensity differences) at the pixel or subpixel level.

There are some interpretation tasks, such as those involving spatial transformations of volumetric medical image data, which facilitate a need to estimate missing or needed tissue information. In the field of biomedical image analysis, estimating missing tissue pixel information from existing tissue pixel information is called interpolation. Interpolation of three- and four-dimensional medical image data can be particularly challenging due to the size and non-uniformity of the datasets. Algorithmic efficiency and image deterioration are two factors to consider when selecting an appropriate interpolation procedure. While in the prior art, one factor is typically chosen at the expense of the other factor, it is desirable to provide systems and methods that facilitate interpolation processing both efficiently and with minimal image deterioration.

SUMMARY

This invention overcomes disadvantages of the prior art by providing a system, a method, and a recorded, non-transitory computer-readable medium comprising instructions for processing volumetric image data obtained from scanning a tissue structure comprising receiving the volumetric image data at a processor, determining spatial transformations of the received image data, performing, with a processor, a hybrid interpolation on the image data based upon the determined spatial transformations in three dimensions, wherein the hybrid interpolation includes performing a discrete order of interpolation, respectively, for at least two dimensions of the image data, and outputting at least one of an observable image or medical image information derived from the hybrid interpolated volumetric image data.

In an illustrative embodiment, the hybrid interpolation comprises interpolating, in a higher order, based upon the determined spatial transformations in at least a first dimension and a second dimension of the three dimensions of the image data; and then interpolating, in a lower order, based upon information derived from the higher order interpolation and the determined spatial transformation in a third dimension of the image data. Interpolating, in the higher order, can comprise performing a bicubic interpolation in at least one of the two dimensions. Interpolating, in the lower order, can comprise performing a linear interpolation in the third dimension. In an illustrative embodiment, the linear interpolation is defined by a function $p+\Delta z(i, j, k)*(q-p)$, wherein $\Delta z(i, j, k)$ defines a spatial transformation in the third dimension; and p and q represent information derived from the higher order interpolation.

In an illustrative embodiment, the spatial transformations are determined based on a comparison between the volumetric image data and a second set of volumetric image data, the second set being obtained from scanning the tissue structure at a different time point. The volumetric image data and the second set of volumetric image data of the tissue structure can differ in at least one of image resolution, level of contrast agent enhancement in the tissue structure, and motion.

In an illustrative embodiment, the volumetric image data is obtained from scanning the tissue structure using at least one of magnetic resonance (MR) or position emission tomography (PET) imaging technology. The volumetric image data can be non-isotropic. The medical image information can comprise at least one of a temporal subtraction map, a parametric map, a signal intensity time curve, a region of interest (ROI), or a volume of interest (VOI).

BRIEF DESCRIPTION OF THE DRAWING

The invention description below refers to the accompanying drawings, of which.

DETAILED DESCRIPTION

Figure 1:
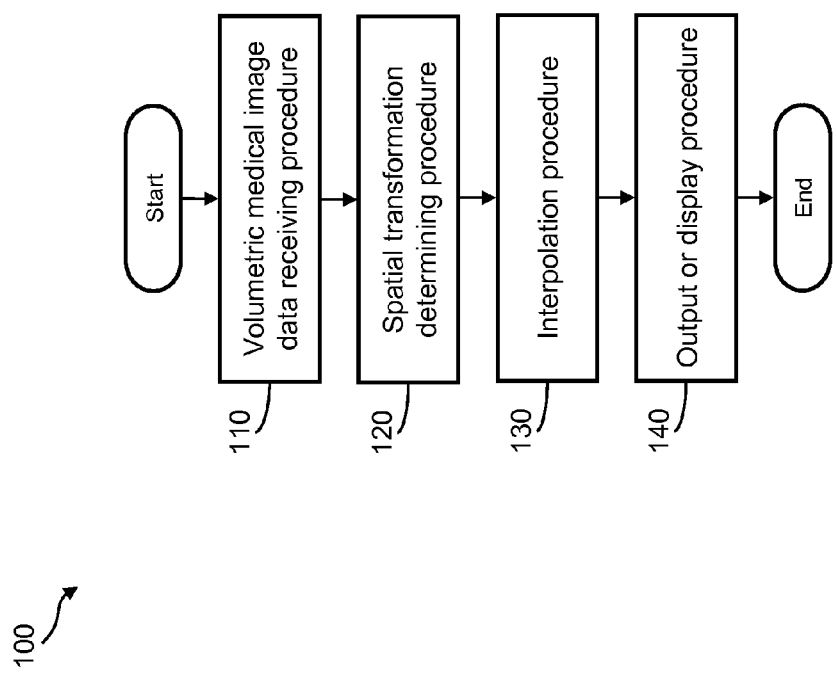
FIG. 1 is a runtime flow chart showing a volumetric medical image processing procedure, including a plurality of associated sub-procedures performed according to an illustrative embodiment.

As used herein, the terms "pixels" and "voxels" are employed interchangeably to refer to an individual measurable element in an image or in data constituting any portion of image. Image data is generally represented in units of picture elements (pixels). A pixel generally refers to the information stored for a single grid in an image or a basic unit of the composition of an image, usually in a two-dimensional space, for example, x-y coordinate system. Pixels can become volumetric pixels or "voxels" in three-dimensional space (x,y,z coordinates) by the addition of a third dimension, often specified as a z-coordinate. A voxel thus refers to a unit of volume corresponding to the basic element in an image that corresponds to the unit of volume of the tissue being scanned. It should be appreciated that this disclosure can utilize pixels, voxels, and any other unit representations of an image to achieve the desirable objectives presented herein.

Each individual measurable element of medical image data is characterized by a discrete property identifying the manner in which tissue represented at that location respond in the presence of applied signals and/or injected or ingested substances. Thus, as used herein, the terms "signal" or "signal information" are employed interchangeably to refer broadly to a value or array of values of such properties, which can be stored in memory, processed using a processor, and/or transmitted over either a wired or wireless transmission medium. As such, the term "signal" as used herein should be taken broadly to include various image data that is stored, transmitted and/or displayed, which embodies such properties, and is not limited to transmitted electromagnetic waves. Examples of such properties embodied by the signals, signal information or image data include intensity and/or color, which are typically defined as one or more digital values within a given range (for example, grayscale intensity between 0 and 255, or discrete RGB values each between 0 and 255). Examples of such injected or ingested substances include, but are not necessarily limited to, contrast agents (e.g., Gadolinium) or tracers (e.g., positron-emitting radionuclides).

The present disclosure describes various embodiments for spatially transforming and interpolating volumetric medical image data. Illustrative spatial transforms include, but are not necessarily limited to, medical image registration or scaling transformations. Certain embodiments of interpolation procedures set forth in this disclosure can improve the visual quality of spatially transformed medical imagery. That is, the differences in tissue contrast can be more preserved over other interpolation methods that over-smooth or under-smooth image data. These embodiments can also be advantageous from a computational algorithmic perspective; that is, they can provide an acceptable image quality at a computationally reasonable expense. The various embodiments of the disclosure can facilitate a more accurate visual or programmatic (i.e., computer-aided) detection/diagnosis of particular types of medical conditions.

FIG. 1 is a flowchart of an overall procedure 100 for the spatial transformation and interpolation of volumetric medical image information according to an embodiment of this disclosure. The procedure includes a volumetric medical image data receiving procedure 110, a spatial transformation determining procedure 120, an interpolation procedure 130, and an output or display procedure 140. In an illustrative embodiment, the procedures are executed using a medical image processing device, also referred herein to as a medical image processing apparatus, medical image processing system, or digital computer. One such illustrative device is described in further detail herein below.

According to an embodiment of the procedure 100, the medical image data receiving procedure 110 includes acquiring, generating, retrieving, receiving, loading, and/or otherwise obtaining signal information for tissue at a plurality of pixels in at least three spatial dimensions, referred to herein as x, y, and z. A plurality of pixels in two-dimensional x-y position-space can represent a slice image or a portion of a slice image of tissue. A plurality of slices along a third- (z-) dimension can represent a tissue volume or a portion of a volume of tissue. In this disclosure, for notation purposes, the total size of the tissue volume can be represented by the notation dim_x by dim_y by dim_z. Each pixel has a two-dimensional size based on the field of view and number of elements in-slice or in-plane. For notation purposes, we represent each pixel by the spatial coordinates i, j, k in which i=(1, 2 ... dim_x), j=(1, 2, ... dim_y), and k=(1, 2, ... dim_z). Illustratively, pixels in the same plane along the z-dimension can be separated by a spacing factor that exceeds the in-plane pixel size, making the dataset anisotropic (i.e., non-uniform). Embodiments of the procedures set forth in this disclosure may be particularly advantageous when applied to such datasets, which will become clearer upon further reading of this disclosure.

In certain embodiments, the medical image data receiving procedure 110 can involve obtaining signal information for tissue imaged using dynamic, contrast-enhanced medical imaging technology. To appreciate the amount of pixel signal information that can be commonly generated in examinations employing such technology, by way of example, each image slice can contain 512 by 512 pixels and each pixel has a two-dimensional size of 0.75 mm×1.0 mm. Also by way of example a total of 176 slices having a slice spacing of 3 mm form a single volumetric medical image of the tissue, meaning this dataset is non-isotropic. Thus, in this exemplary implementation, a total of over 46 million pixel signal values in a single volume may require processing. Dynamic, contrast-enhanced MRI (DCE-MRI) examinations typically generate multiple volumetric medical images of this type temporally before (pre-) and after (post-) administration of a contrast agent. Computational advantages gained by employing various embodiments of this disclosure will become clearer upon further reading of this disclosure.

In certain embodiments, the receiving procedure 110 can include receiving multi-modal signal information for tissue acquired as part of a multi-modal image scanning procedure. Different modes of multi-modal medical image data can be formed at different resolutions due to differences in imaging scanners or parameters, in which case the transformation and interpolation methods of the present disclosure can be employed to spatially transform a first portion of multi-modal medical image data so as to match the resolution of a second portion of multi-modal medical image data. For example, positron emission tomography (PET) image data, which characterizes the biological function of the body before anatomical changes take place, is typically acquired at a lower resolution than computed tomography (CT) image data, which provides information about the body's anatomy such as size, shape and location. By increasing the resolution of PET image data based on a comparison between the resolution at which the PET image data was acquired and the resolution at which the CT image data was acquired, cross-comparisons of the multi-modal scan information can be performed if appropriate. Such cross-comparisons can enable physicians to more accurately detect and/or diagnose cancer (e.g., presence of colorectal polyps), heart disease and brain disorders, for example.

According to an embodiment of the overall procedure 100, the spatial transformation determining procedure 120 includes the step of (a) identifying an x-dimension spatial transform $\Delta x(i, j, k)$, (b) identifying a y-dimension spatial transform $\Delta y(i, j, k)$, and (c) identifying a z-dimension spatial transform $\Delta z(i, j, k)$. Note that i, j, and k are integers of a grid point; $\Delta x(i,j,k)$, $\Delta y(i,j,k)$, and $\Delta z(i,j,k)$ can be real numbers. Applying the spatial transforms to an image $img(i,j,k)$ obtained at the receiving procedure 110, a spatially transformed image, denoted as img(i+Δx(i,j,k), j+Δy(i,j,k), k+Δz (i,j,k)), can be obtained.

By way of one example, a global translation of 10 pixels in the x-direction can be specified as follows: Δx(i,j,k)=10, Δy(i, j,k)=0, and Δz(i,j,k)=0 where i=(1, 2 . . . dim_x), j=(1, 2 . . . dim_y), and k=(1, 2 . . . dim_z). The spatial transformation can also be used to capture global affine transforms as well as local deformations.

Figure 2:
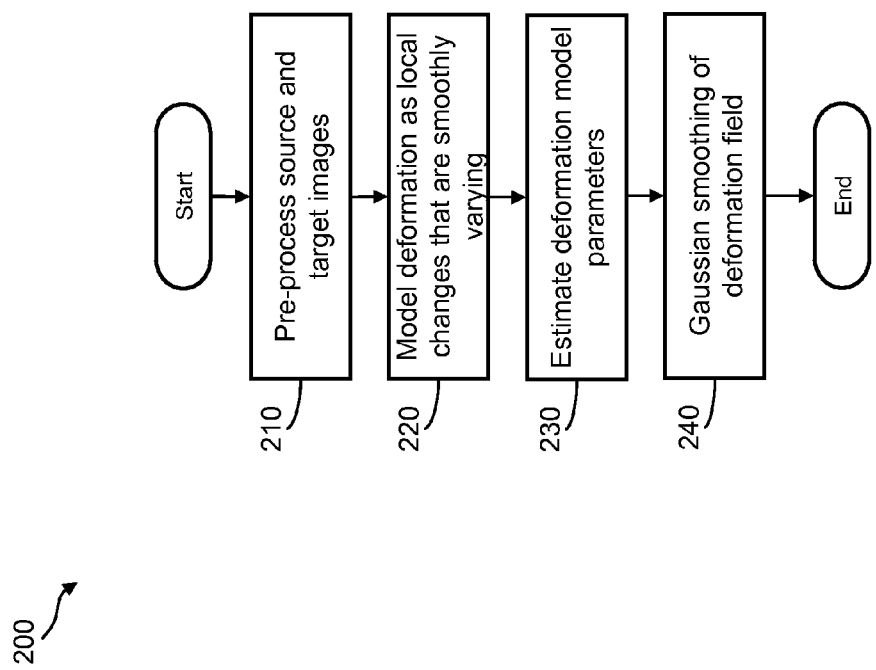
FIG. 2 is a runtime flow chart showing an illustrative spatial transformation determining procedure of particular use in image registration/motion correction applications that can be performed as part of the medical image processing procedure of FIG. 1.

Such spatial transforms can include transformations for registering a source image to a target image, used in image registration applications. Such applications can correct for differences in the amount of patient motion distortions present between source images and target images. In these applications, the spatial transform is sometimes referred to as a deformation field or a warp field. By way of example, referring now to FIG. 2, one deformation estimation procedure 200 can involve the following steps. First, the source and target images are pre-processed to remove intensity inhomogeneity (step 210), which can possibly be introduced during the image acquisition procedure. Then, an assumption can be made; that is, the deformation is modeled as local changes that are smoothly varying (step 220). This assumption is valid for obtaining acceptable results with the illustrative procedure. In a further step, the deformation model parameters, also referred to as the deformation field, are estimated using a numerical technique known of one to skill (step 230). One such illustrative technique is conjugate gradient minimization. Finally, the deformation field is smoothed by applying a Gaussian smoothing (step 240). Real number values for Δx(i, j,k), Δy(i,j,k), and Δz(i,j,k) can be estimated using such an algorithmic procedure. One of skill will recognize that other particular details of spatial transformation and deformation estimation procedures will be dependent on various characteristics associated with the particular volumetric medical image data under processing. Other spatial transformation determination procedures of conventional or novel design can also be performed according to embodiments that can include, but are not necessarily limited to, determining the spatial transformation based on an operation (e.g., rotation, re-scaling) invoked manually by an operator on an image (or a portion thereof) via an input device.

According to an embodiment of the procedure 100, the interpolation procedure 130 illustratively calculates the spatially transformed image img(i+Δx(i,j,k), j+Δy(i,j,k), k+Δz(i, j,k). In one embodiment of this disclosure, a separable or hybrid interpolation procedure can be employed. The separable interpolation procedure includes selecting and executing different interpolative techniques in accordance with the resolution of different dimensions of the medical image data. For example, the resolution of tissue information in the z-dimension can be of a lower resolution than tissue information in both the x- and y-dimensions. This is typical in volumetric medical imaging. An illustrative hybrid interpolation of this information can include the steps of (a) performing a higher order interpolation from tissue signal information and spatial transformations in the x- and y-dimensions, and (b) then performing a lower order interpolation using the higher order interpolation computations and spatial transformations in the z-dimension.

Figure 3:
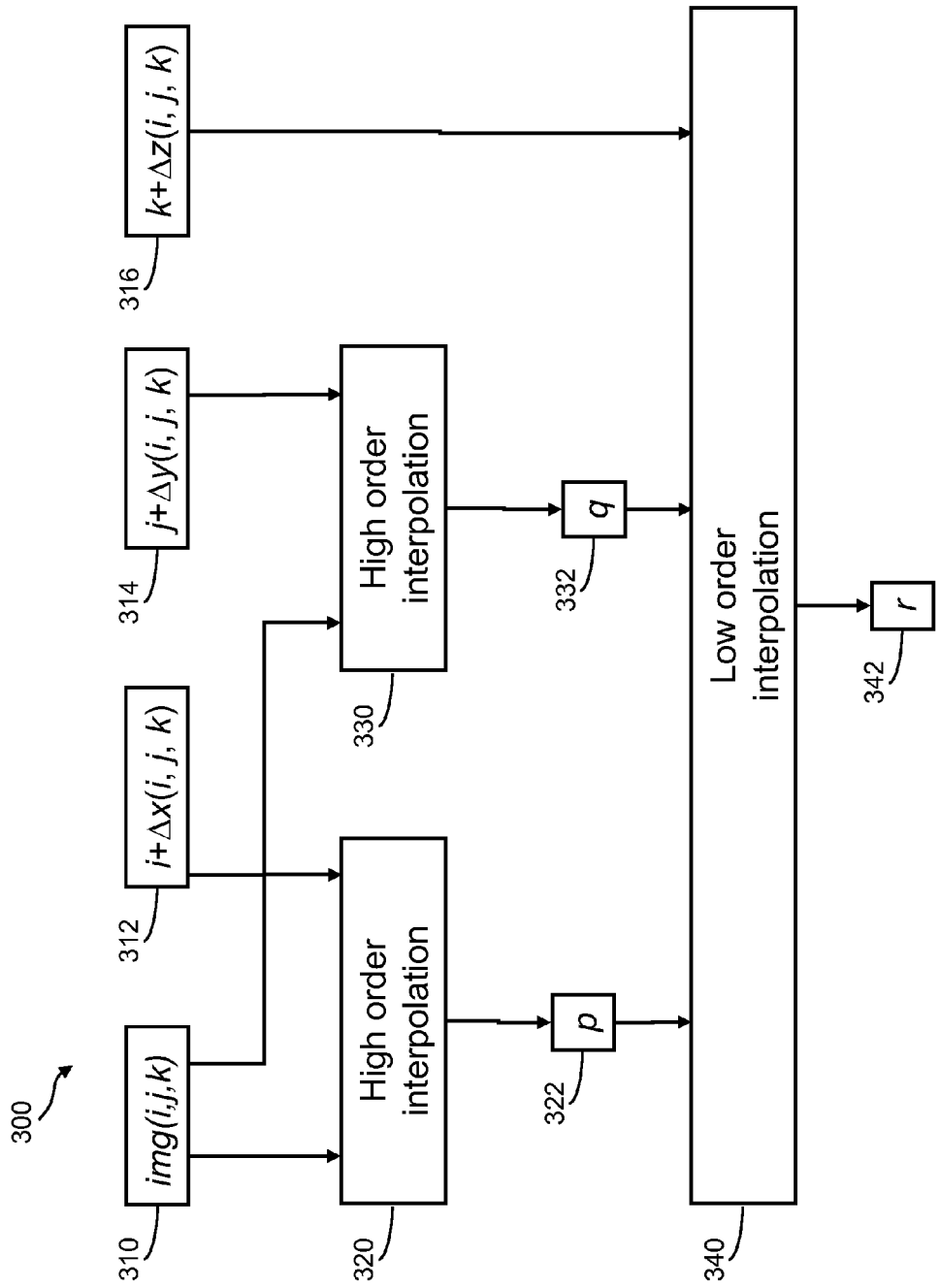
FIG. 3 is a runtime flow chart showing an illustrative hybrid interpolation procedure that can be performed as part of the medical image processing procedure of FIG. 1.

FIG. 3 is a flowchart showing the steps of a separable or hybrid interpolation procedure 300 according to an embodiment of this disclosure in further detail. The procedure can be performed as part of the interpolation procedure 130 of FIG. 1. As illustrated, the inputs to the procedure include the input image img(i,j,k) 310, and spatial transforms i+Δx(i,j,k) 312, j+Δy(i,j,k) 314, and k+Δz(i,j,k) 316, all of which have been previously described herein above.

The hybrid interpolation procedure 300 can include the steps of (a) performing a high order interpolation procedure 320 for img(i+Δx(i,j,k), j+Δy(i,j,k), k) to compute an interpolation parameter p 322, (b) performing a high order interpolation procedure 330 for img(i+Δx(i,j,k), j+Δy(i,j,k), k+1) to compute an interpolation parameter q 332, and then (c) performing a low order interpretation procedure 340 for img (i+Δx(i,j,k), j+Δy(i,j,k), k+Δz(i,j,k)) using values derived from the high order interpolation procedures (e.g., p, q), and the third-dimension spatial transform Δz(i,j,k) to compute an interpolation parameter r 342.

The terms "high order" or "higher order" are both used to contrast a form of interpolation that estimates missing information from a greater number of surrounding pixel signal values from a form of interpolation that estimates missing information from a lesser number of pixel signal values. The terms "low order" or "lower order" are both used to contrast a form of interpolation that estimates missing information from a fewer number of surrounding pixel signal values from a form of interpolation that estimates missing information from a greater number of pixel signal values.

According to one embodiment of procedure 300, either or both of the high order interpolation procedures 320 and 330 can involve performing a bicubic interpolation. By way of useful background, bicubic interpolation is one form of two-dimensional, multivariate interpolation known to those of skill in the art. An interpolated value can be determined from 16 surrounding signal values in both the x- and y-dimensions (i.e., intra- or within slice). Additional information about bicubic interpolation can be seen in "Cubic convolution interpolation for digital image processing", R. Keys, *IEEE Transactions on Signal Processing, Acoustics, Speech, and Signal Processing* 29: 1153 (1981), which is incorporated herein by way of useful background. One of skill in the art will recognize that there are other forms of interpolation that can be performed as part of the high order interpolation procedures such as, but not necessarily limited to, a sinc filter.

Note that different, discrete orders of interpolation can also be performed in the x- and y-dimensions, particularly if the resolution of information in the x-dimension is significantly different from the resolution of information in the y-dimension. That is, it is expressly contemplated that three different, respective orders of interpolation procedures can be performed according to the resolution associated with each of the x-, y-, and z-dimensions of the volumetric medical image data.

According to one embodiment of hybrid interpolation procedure 300, the low order interpolation procedure 340 can involve performing a linear interpolation of p 322, q 332, and Δz(i,j,k) as determined by the spatial transformation determining procedure 120. Illustratively, the linear interpolation computation can take the form of the following Equation 1:

$$r = p + \Delta z(i,j,k) * (q - p) \quad \text{(Eq. 1)}$$

As an alternative to linear interpolation, the low order interpolation procedure 340 can involve performing a cubic or a fourth order interpolation, in which case the procedure 300 can include an additional high order interpolation sub-procedures 320 for extracting variables n and o from img(i+Δx(i,j,k), j+Δy(i,j,k), k−1) and img(i+Δx(i,j,k), j+Δy(i,j,k), k+2) and the low order interpolation procedure can include performing the cubic interpolation of n, o, p, q, and Δz(i,j,k).

A computer system performing the procedure 100 can store each computed interpolation value r 342 of img(i+Δx(i, j,k), j+Δy(i,j,k), k+Δz(i,j,k)) on a disk or in a primary memory.

Storage in a primary memory can allow for fast rendering in applications in which interpolation is used to render real- or near real-time interpolated images for visualization.

Again with reference to FIG. 1, according to an embodiment of the overall procedure 100, the output procedure 140 can include outputting an observable image, such as an image formed from an array of computed interpolation values r 342, to an output device (e.g., a computer monitor or other visualization device) for visualization by medical professionals.

Alternatively or additionally, the output procedure 140 can include outputting medical image information derived from the interpolated volumetric medical image data. For example, in embodiments involving the interpolation of images acquired as part of a multi-modal examination, the medical image information for output can be derived from both an interpolated first portion of multi-modal medical image data (e.g., interpolated PET image) and a second portion of multi-modal medical image data (e.g., original CT image). Illustratively, the medical image information can be an image or map illustrating response or parametric values derived by combining the signal values of both the interpolated first portion and second portion.

By way of another example, in embodiments involving interpolation for image registration/motion correction applications, the medical image information can be derived from an analysis of the temporal behavior of signal information in the registered images. Examples of medical image information include temporal subtraction maps, parametric maps, signal intensity time curves, or segmented regions/volumes of interest (ROIs/VOIs), all of which can be useful in the detection/diagnosis of different types of medical conditions. Various techniques for deriving these exemplary image types and image data are generally known in the art and thus, are not described with any further detail herein.

Figure 4:
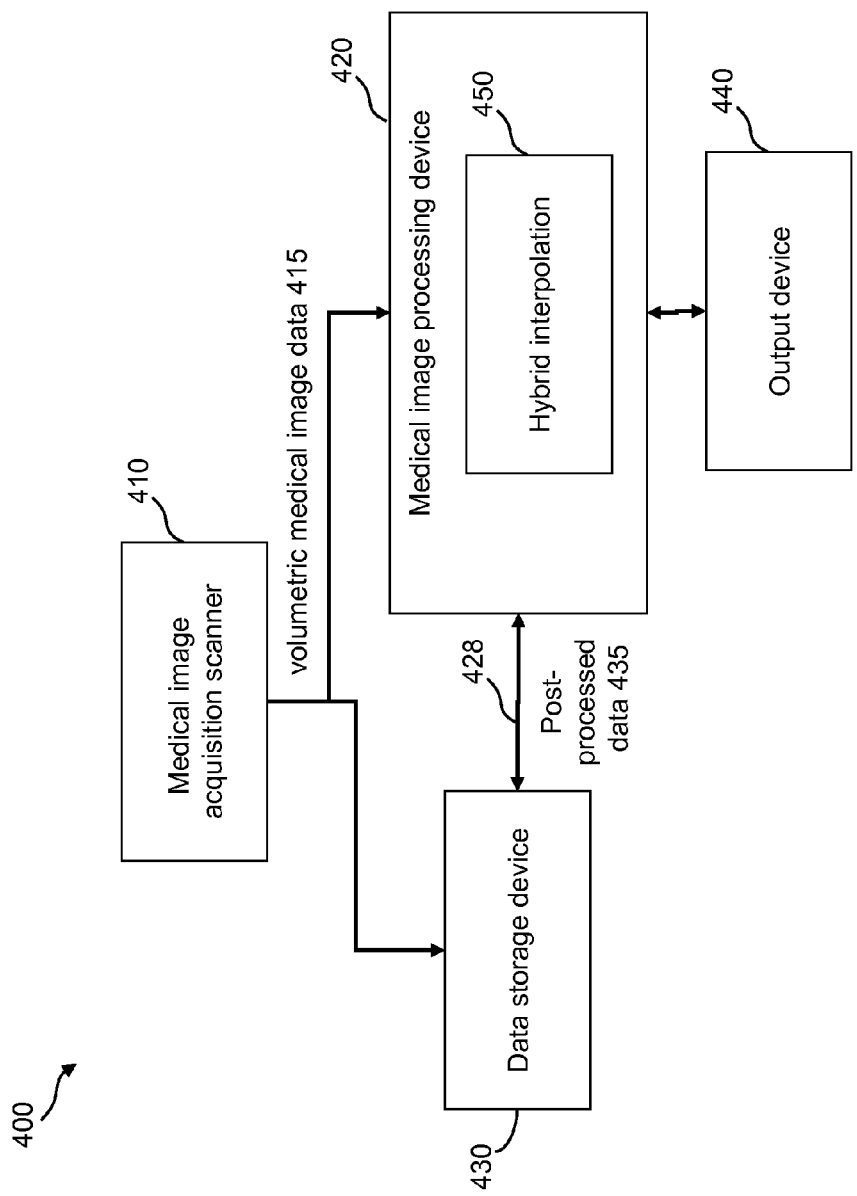
FIG. 4 is a block diagram of a medical examination system according to an illustrative embodiment that employs a medical image processing device suitable for executing the procedures of FIGS. 1, 2 and 3.

FIG. 4 is a block diagram of a medical examination system or apparatus 400 according to an illustrative embodiment of this disclosure. The system comprises a medical image acquisition scanner or device 410. The scanner can utilize any number of imaging technologies to create volumetric medical image data 415 such as, but not necessarily limited to, magnetic resonance, computed tomography (CT), or positive emission tomography (PET) imaging technologies. For example, scanners employing MRI technology are known in the art and have been previously described in U.S. Pat. No. 7,620,227 and "Breast MRI: Fundamentals and Technical Aspects," R. Edward Hendrick, Springer Science and Business Media, 2008, ISBN 978-0-387-73506-1, the teachings of which are incorporated herein by reference as useful background information.

The medical image acquisition scanner 410 can be coupled via appropriate data links (electronic, electro-optical, wireless, etc.) to a medical image processing device 420, also referred to herein as a medical image processing or review apparatus/system/workstation, or more generally a digital computer (e.g. a general purpose PC or a purpose-built processing device), capable of executing image processing instructions on medical image data 415 generated by the scanner in accordance with an illustrative embodiment. One exemplary medical image review workstation employing a thin client architecture, VersaVue Enterprise, is offered for sale by iCAD, Inc., the assignee of the present disclosure. Exemplary instructions can include, but are not necessarily limited to, the procedure 100 and associated sub-procedures described herein above in this disclosure, and denoted generally by the hybrid interpolation block 450. The procedures herein can be fully instantiated in the processing device 420, or can be distributed into other devices within the overall system and/or into additional functional devices (e.g. logic units, band pass filters, etc.). Also, other recorded, computer-assisted analysis instructions can be executed as well. The input to such instructions can take the form of various output of the procedure 100 or, alternatively, the output of such instructions can become the input to procedure 100. Such functions can be realized by suitable combinations of hardware and/or recorded/non-transitory software components of the computer such as, but not necessarily limited to, microprocessors, digital signal processors (DSPs), field-programmable gate arrays (FPGAs), main memories, secondary/auxiliary memories, input/output devices, operating system software, application software, etc. Any such functions, either entirely or in part, can be further implemented on a recorded/non-transitory computer-readable medium or media that can be read by the computer to achieve the desired objectives presented herein. Note that while the process functions herein are assigned to discrete processor blocks by way of illustration, it is expressly contemplate that functions of various blocks can be consolidated, expanded to further processor blocks or reordered between blocks as appropriate to carry out the overall process described herein. More generally, such structures and/or functions are herein referred to as "process/processor" as they can be implemented as physical processing structures and/or as functions within a more general processing device, such as a general purpose computer or other software-instruction processing unit.

The medical image processing device 420 can include or comprise the console for controlling and acquiring images 415 from the medical image acquisition scanner 410, where such console is capable of executing program instructions in the form of a computer-readable medium and/or contains hardware for carrying out the processes of the illustrative embodiment. Alternatively, the console can be deployed as part of a device separate from the image processing device and operatively connected thereto by appropriate network interconnections.

The medical image acquisition scanner 410 can also be coupled to a data storage device 430 for storing the volumetric medical image data 415 on disk. By way of one non-limiting example, the storage device can be a Picture Archiving and Communication System (PACS) capable of storing, retrieving, and distributing medical image data between components of the medical examination system 400. Alternatively, any directly attached or networked storage device with appropriate data organization can be employed to store, and allow retrieval of, the image datasets. For example, the storage device can comprise a removable disk or solid-state storage, a network-attached-storage appliance, a storage area network (SAN) and/or a remote data store accessed by a secure private network, such as a hospital wide area network or a public network. Appropriate layers of encryption can be applied to the transmitted as well as the stored data as required to satisfy various governmental and institutional security requirements. Such encryption techniques should be clear to those of ordinary skill.

In an embodiment, the medical image processing device 420 and the data storage device 430 are also coupled together (represented by a link 428). This can allow the data storage device to transmit the volumetric medical image data 415 to be post-processed by the image processing device as needed. The image processing device can be further arranged to transmit the results of image post-processing in the form of post-processed data 435 to the storage device for storage for subsequent handling and use. In certain embodiments of this disclosure, the post-processed data can include spatially transformed, interpolated volumetric medical image data and/or information derived from the interpolated medical image data for viewing by a medical professional.

Another component of the medical examination system 400 is an output device 440 for outputting volumetric medical image data and/or post-processed data 435. The output device can comprise a printer, a computer monitor, a series of computer monitors, and/or other suitable signal output devices of conventional or novel design. The signals can be output in the form of raw image data, post-processed image data, or combinations thereof for visual inspection of the tissue.

It is expressly contemplated that components of the medical examination system 400 can connect to, and communicate, with each other via one or more of any type or combination of types of communication interfaces, including but not limited to physical interfaces, network interfaces, software interfaces, and the like. The communication can be by means of a physical connection, or can be wireless, optical, or by other means. Alternatively, image datasets can be transmitted indirectly by use of transportable storage devices (not shown in FIG. 4) such as but not limited to compact discs (CDs), digital video discs (DVDs), or solid state "flash" drives, in which case readers for said transportable storage devices can function as communication interfaces of the system.

CONCLUSION

The foregoing has been a detailed description of illustrative embodiments of the invention. It should be clear that the illustrative embodiments provide techniques for interpolating volumetric medical image that provide an excellent trade-off between image quality and computational speed. It should also be clear that transformations resulting from the illustrative embodiments can be of use in improving both visual and programmatic detection/diagnosis of particular types of medical conditions. Various modifications and additions can be made without departing from the spirit and scope of this invention. Each of the various embodiments described above may be combined with other described embodiments in order to provide multiple features. Furthermore, while the foregoing describes a number of separate embodiments of the system and method of the present invention, what has been described herein is merely illustrative of the application of the principles of the present invention. For example, some or all of the processes described herein can be implemented in hardware, software, including a non-transitory computer-readable medium of program instructions. Moreover, while magnetic resonance medical images of anatomical breasts have been presented to illustrate various aspects of the illustrative embodiments, such medical images should not be construed as limiting the utility of the present invention to any one particular organ, gland, or tissue, nor should such images be construed as limiting the utility of the present invention to images acquired with one particular type of medical imaging technology or scanner. Accordingly, this description is meant to be taken only by way of example, and not to otherwise limit the scope of this invention.

What is claimed is:

1. A method for processing volumetric image data obtained from scanning a tissue structure comprising the steps of:
    a. receiving the volumetric image data;
    b. performing, with a processor, a hybrid interpolation on the image data in three dimensions, wherein the hybrid interpolation comprises:
        i. interpolating, in a higher order, in at least a first dimension and a second dimension of the three dimensions of the image data; and
        ii. interpolating, a lower order, based upon information derived from the higher order interpolation, in a third dimension of the image data;
    c. outputting at least one of an observable image or medical image information derived from at least the hybrid interpolated volumetric image data.

2. The method of claim 1, wherein the step of interpolating, in the higher order, comprises performing a bicubic interpolation in at least one of the two dimensions.

3. The method of claim 1, wherein the step of interpolating, in the lower order, comprises performing a linear interpolation in the third dimension.

4. The method of claim 3, wherein the linear interpolation is defined by a function $p+\Delta z(i, j, k)*(q-p)$, wherein:
    a. $\Delta z(i, j, k)$ defines a spatial transformation in the third dimension; and
    b. p and q represent information derived from the higher order interpolation.

5. The method of claim 1, wherein the spatial transformations are determined based on a comparison between the volumetric image data and another set of volumetric image data, the second set being obtained from scanning the tissue structure at a different time point.

6. The method of claim 5, wherein the volumetric image data and the another set of volumetric image data of the tissue structure differ in at least one of image resolution, level of contrast agent enhancement in the tissue structure, and amount of motion.

7. The method of claim 1, wherein the volumetric image data is non-isotropic.

8. The method of claim 1, wherein the volumetric image data is obtained from scanning the tissue structure using at least one of magnetic resonance (MR) or position emission tomography (PET) imaging technology.

9. The method of claim 1, wherein the medical image information comprises at least one of a temporal subtraction map, a parametric map, a signal intensity time curve, a region of interest (ROI), or a volume of interest (VOI).

10. A system for processing volumetric image data obtained from scanning a tissue structure comprising:
    a. at least one processor that receives the volumetric image data and is constructed and arranged to perform a hybrid interpolation on the image data in three dimensions, wherein the hybrid interpolation comprises:
        i. a higher order interpolation in at least a first dimension and a second dimension of the three dimensions of the image data; and
        ii. a lower order interpolation, based upon information derived from the higher order interpolation, in a third dimension of the image data
    b. at least one output device that is constructed and arranged to output at least one of an observable image or medical image information based upon the hybrid interpolated volumetric image data.

11. The system of claim 10, wherein the higher order interpolation further comprises a bicubic interpolation in at least one of the two dimensions.

12. The system of claim 10, wherein the lower order interpolation comprises performing a linear interpolation in the third dimension.

13. The system of claim 12, wherein the linear interpolation comprises a function $p+\Delta z(i, j, k)*(q-p)$, wherein:
    a. $\Delta z(i, j, k)$ defines a spatial transformation in the third dimension; and
    b. p and q defines information derived from the higher order interpolation.

14. The system of claim 10, wherein the spatial transformations are based on a comparison between the volumetric image data and another set of volumetric image data, the second set being obtained from scanning the tissue structure at a different time point.

15. The system of claim 14, wherein the volumetric image data and the another set of volumetric image data of the tissue structure differ in at least one of image resolution, level of contrast agent enhancement in the tissue structure, and amount of motion.

16. The system of claim 10, wherein the volumetric image data is non-isotropic.

17. The system of claim 10, wherein the volumetric image data is obtained from scanning the tissue structure using at least one of magnetic resonance (MR) or position emission tomography (PET) imaging technology.

18. The system of claim 10, wherein the medical image information comprises at least one of a temporal subtraction map, a parametric map, a signal intensity time curve, a region of interest (ROI), or a volume of interest (VOI).

19. A non-transitory recorded computer-readable medium having computer-readable instructions stored thereon which, as a result of being executed in a computer system, instructs the computer system to process volumetric image data obtained from scanning a tissue structure, said instructions comprising instructions for:
    a. receiving the volumetric image data;
    b. performing, with a processor, a hybrid interpolation on the image data in three dimensions, comprising:
        i. interpolating, in a higher order, in at least a first dimension and a second dimension of the three dimensions of the image data;
        ii. interpolating, in a tower order, based upon information derived from the higher order interpolation, in a third dimension of the image data, and
    c. outputting at least one of an observable image and medical image information derived from at least the hybrid interpolated volumetric image data.

20. The recorded computer-readable medium of claim 19, wherein the instructions for interpolating, in the higher order, comprise instructions for performing a bicubic interpolation in at least one of the two dimensions.

21. The recorded computer-readable medium of claim 19, wherein the instructions for interpolating, in the lower order, comprise instructions for performing a linear interpolation in the third dimension.

22. The recorded computer-readable medium of claim 21, wherein the instructions for performing the linear interpolation take the form of the function $p+\Delta z(i, j, k)*(q-p)$, wherein:
    a. $\Delta z(i, j, k)$ represents the spatial transformation in the third dimension; and
    b. p and q represent information derived from the higher order interpolation.

23. The recorded computer-readable medium of claim 19, wherein the instructions for determining spatial transformations of the received image data comprise instructions for comparing the volumetric image data to another set of volumetric image data.

24. The recorded computer-readable medium of claim 19, wherein the instructions for outputting medical image information further comprises instructions for computing at least one of a temporal subtraction map, a parametric map, a signal intensity time curve, a region of interest (ROI), or a volume of interest (VOI) from at least the hybrid interpolated volumetric image data.

25. A method for diagnosis and treatment of a medical condition within an internal body at an effected region comprising the steps of:
    a. imaging the body with respect to at least the effected region so as to provide three-dimensional volumetric image data of the effected region;
    b. performing, with a processor, a hybrid interpolation on the image data in three dimensions, wherein the hybrid interpolation comprises:
        i. interpolating, in a higher order, in at least a first dimension and a second dimension of the three dimensions of the image data; and
        ii. interpolating, in a lower order, based upon information derived from the higher order interpolation, in a third dimension of the image data;
    c. outputting at least one of an observable image and medical image information derived from the hybrid interpolated volumetric image data; and
    d. employing the observable image or medical image information to perform a diagnosis of a medical condition at the effected region so as to determine appropriate treatment thereof.

26. A system for processing volumetric image data obtained from scanning a tissue structure comprising:
    a. means receiving the volumetric image data;
    b. means for performing a hybrid interpolation on the image data based in three dimensions, wherein the hybrid interpolation comprises:
        i. means for performing a higher order interpolation in at least a first dimension and a second dimension of the three dimensions of the image data; and
        ii. means for performing a lower order interpolation, based upon information derived from the higher order interpolation, in third dimension of the image data
    c. means for outputting at least one of an observable image and medical image information derived from at least the hybrid interpolated volumetric image data.

* * * * *